US006479792B1

United States Patent
Beiermann et al.

(10) Patent No.: US 6,479,792 B1
(45) Date of Patent: Nov. 12, 2002

(54) WELDING MACHINE, SYSTEM AND METHOD THEREFOR

(75) Inventors: Bradley S. Beiermann, Libertyville, IL (US); Richard C. Francke, Bartlett Lakes, IL (US)

(73) Assignee: Illinois Tool Works Inc., Glenview, IL (US)

( * ) Notice: Subject to any disclaimer, the term of this patent is extended or adjusted under 35 U.S.C. 154(b) by 52 days.

(21) Appl. No.: 09/656,274

(22) Filed: Sep. 6, 2000

(51) Int. Cl.$^7$ ................................................. B23K 9/10
(52) U.S. Cl. ............................. 219/130.5; 219/130.01; 700/145
(58) Field of Search .................... 219/130.5, 130.01, 219/132, 86.41, 108, 110; 700/97, 95, 96, 145

(56) References Cited

U.S. PATENT DOCUMENTS

| | | | |
|---|---|---|---|
| 5,166,491 A | * 11/1992 | Izume et al. | 219/110 |
| 5,321,229 A | 6/1994 | Holling et al. | |
| 5,805,442 A | * 9/1998 | Crater et al. | |
| 5,808,885 A | * 9/1998 | Dew et al. | 219/110 |
| 6,000,429 A | 12/1999 | Van Marcke | |
| 6,002,104 A | 12/1999 | Hsu | |
| 6,018,136 A | * 1/2000 | Ohmi et al. | 219/130.01 |
| 6,169,263 B1 | * 1/2001 | Derby, Jr. et al. | 219/86.41 |
| 6,243,611 B1 | * 6/2001 | Hazama et al. | 700/97 |

FOREIGN PATENT DOCUMENTS

| | | |
|---|---|---|
| EP | 0986240 | 3/2000 |
| WO | WO99/09068 | 2/1999 |
| WO | WO99/09780 | 2/1999 |

OTHER PUBLICATIONS

Rippey et al., "The NIST Automated Arc Welding Testbed", Proceedings of the 7th Internaltional Conference on Computer Technology in Welding, Jul. 1997.*
em Ware, Salt Lake City, UT, "EMIT, Device Networking Software" Brochure, 2000, 6 pgs.
em Ware, Salt Lake City, UT, "EMIT User's Manual", 1999, Table of Contents, Chapters 1–6 & Index.

* cited by examiner

Primary Examiner—Clifford C. Shaw
(74) Attorney, Agent, or Firm—John H. Pilarski; Mark W. Croll

(57) ABSTRACT

A welding machine having an embedded controller with a processor, a network gateway interface device coupled to the embedded controller, an operating program segment stored in a memory of the embedded controller, a gateway communication program segment stored at least partially in the memory of the embedded controller, and a resource sharing program segment stored in the memory of the embedded controller, the resource sharing program segment allocates processing time of the processor between the gateway communication program segment and the operating program segment. The machine may be monitored, controlled, accessed and updated with software over a network from a remote user interface, embodied for example on an Internet browser.

26 Claims, 2 Drawing Sheets

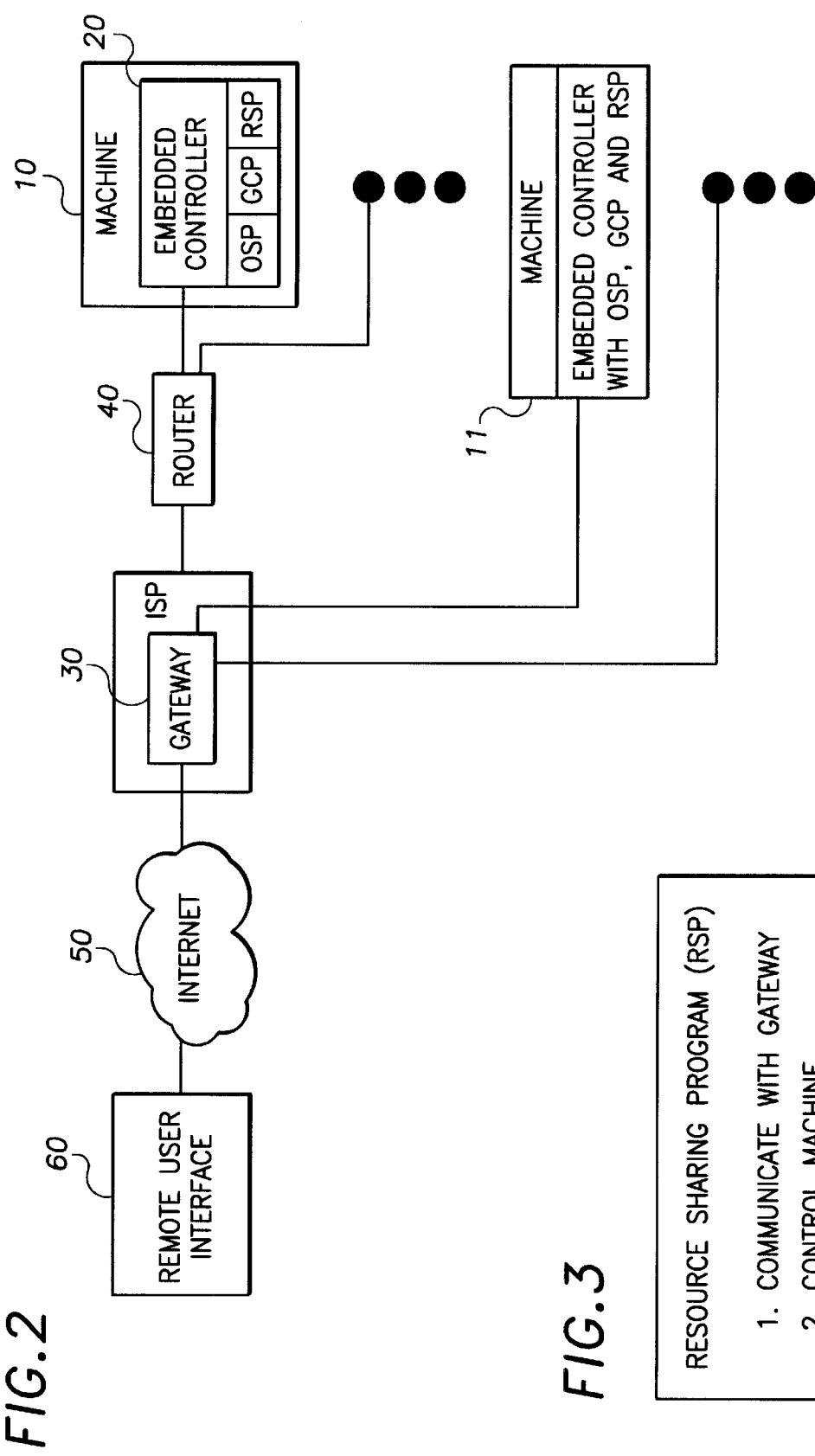

WELDING MACHINE, SYSTEM AND METHOD THEREFOR

BACKGROUND OF THE INVENTION

The invention relates generally to welding machines, and more particularly to processor based, network enabled welding machines and systems therefor.

An object of the present invention is to provide novel welding machines and systems therefor that overcome problems in and improve upon the prior art.

Another object of the invention is to provide in some embodiments thereof novel welding machines and systems therefor that are economical.

Another object of the invention is to provide in some embodiments thereof novel welding machines having processor based embedded controllers that are network enabled.

A further object of the invention is to provide in some embodiments thereof novel network enabled welding machines, particularly those having relatively low processing capacity processors and limited memory resources.

Another object of the invention is to provide in some embodiments thereof novel processor based networked enabled welding machines having a resource sharing program segment stored in a memory thereof to allocate processing time between a welding machine operating program and a communications program executed by the processor.

Another object of the invention is to provide in some embodiments thereof novel networked welding systems having remote user interfaces, for example virtual software control panels embodied on Internet browsers, for interfacing with a welding machine over a network, for example the Internet.

A further object of the invention is to provide in some embodiments thereof novel welding machines having embedded controllers that are controllable remotely over communications networks with a remote user interface device having a virtual control panel, corresponding at least in part to controls on the actual machine, for example user controls accessible from a control panel of the welding machine.

Yet another object of the invention is to provide in some embodiments thereof novel welding machines that are remotely programmable from a remote user interface over a communications network, for example transferring and installing supplemental and/or updated software segments and/or firmware on the welding machine.

A further object of the invention is to provide in some embodiments thereof novel welding machines that may be monitored and/or interrogated from a remote user interface over a communications network.

A more particular object of the invention is to provide in some embodiments thereof novel network enabled welding machines comprising an embedded controller having a processor and memory, preferably a relatively low processing capacity processor, a network gateway interface device coupled to the embedded controller, a welding machine operating program segment stored in a memory portion of the embedded controller, a gateway communication program segment stored at least partially in a memory portion of the embedded controller, and a resource sharing program segment stored in a memory portion of the embedded controller, whereby the resource sharing program segment allocates processing time of the processor between the gateway communication program segment and the welding machine operating program segment.

Another more particular object of the invention is to provide in some embodiments thereof novel welding systems comprising a welding machine having a processor based embedded controller with memory, preferably a relatively low processing capacity processor, input devices coupled to the embedded controller, processor controlled output devices coupled to the embedded controller, a gateway interface device coupled to the embedded controller, an operating program segment stored in a memory portion of the embedded controller, a gateway communication program segment stored at least partially in a memory portion of the embedded controller, a resource sharing program segment stored in a memory portion of the embedded controller, the resource sharing program segment allocating processing time of the processor between the gateway communication program segment and the operating program segment, and a network gateway coupled to the gateway interface device of the embedded controller.

Yet another more particular object of the invention is to provide in some embodiments thereof novel methods for network enabled welding machines having processor based embedded controllers, comprising communicating between a remote user interface and a network gateway over a network using a network communication protocol, communicating between the network gateway and the welding machine over a gateway communications link using a gateway communication protocol different from the network communication protocol, and bridging communications between the network and the gateway communication link with a gateway bridge program.

Still another more particular object of the invention is to provide in some embodiments thereof novel methods for welding machine monitoring systems, the welding machine having a processor based embedded controller with memory, preferably a relatively low processing capacity processor, the method comprising enabling the welding machine to communicate over a network, for example the Internet, by establishing a network communication link between the welding machine and the network, communicating with the welding machine over the network from a remote user interface embodied as a virtual control panel, for example on an Internet browser, and monitoring operational parameters of the welding machine from the remote user interface.

Another more particular object of the invention is to provide in some embodiments thereof novel methods for software reconfiguration of a welding machine over a network, the welding machine having a processor based embedded controller with memory and a welding machine operating program segment stored therein, the method comprising enabling the welding machine to communicate over the network by establishing a network communication link between the welding machine and the network, communicating with the welding machine over the network from a remote user interface embodied as a virtual control panel on an Internet browser, and transferring software over the network from the remote user interface to a memory portion of the embedded controller.

These and other objects, aspects, features and advantages of the present invention will become more fully apparent upon careful consideration of the following Detailed Description of the Invention and the accompanying Drawings, which may be disproportionate for ease of understanding, wherein like structure and steps are referenced generally by corresponding numerals and indicators.

BRIEF DESCRIPTION OF THE DRAWINGS

FIG. 2 is a networked welding system.

FIG. 3 is a resource sharing program segment.

DETAILED DESCRIPTION OF THE INVENTION

Figure 1:
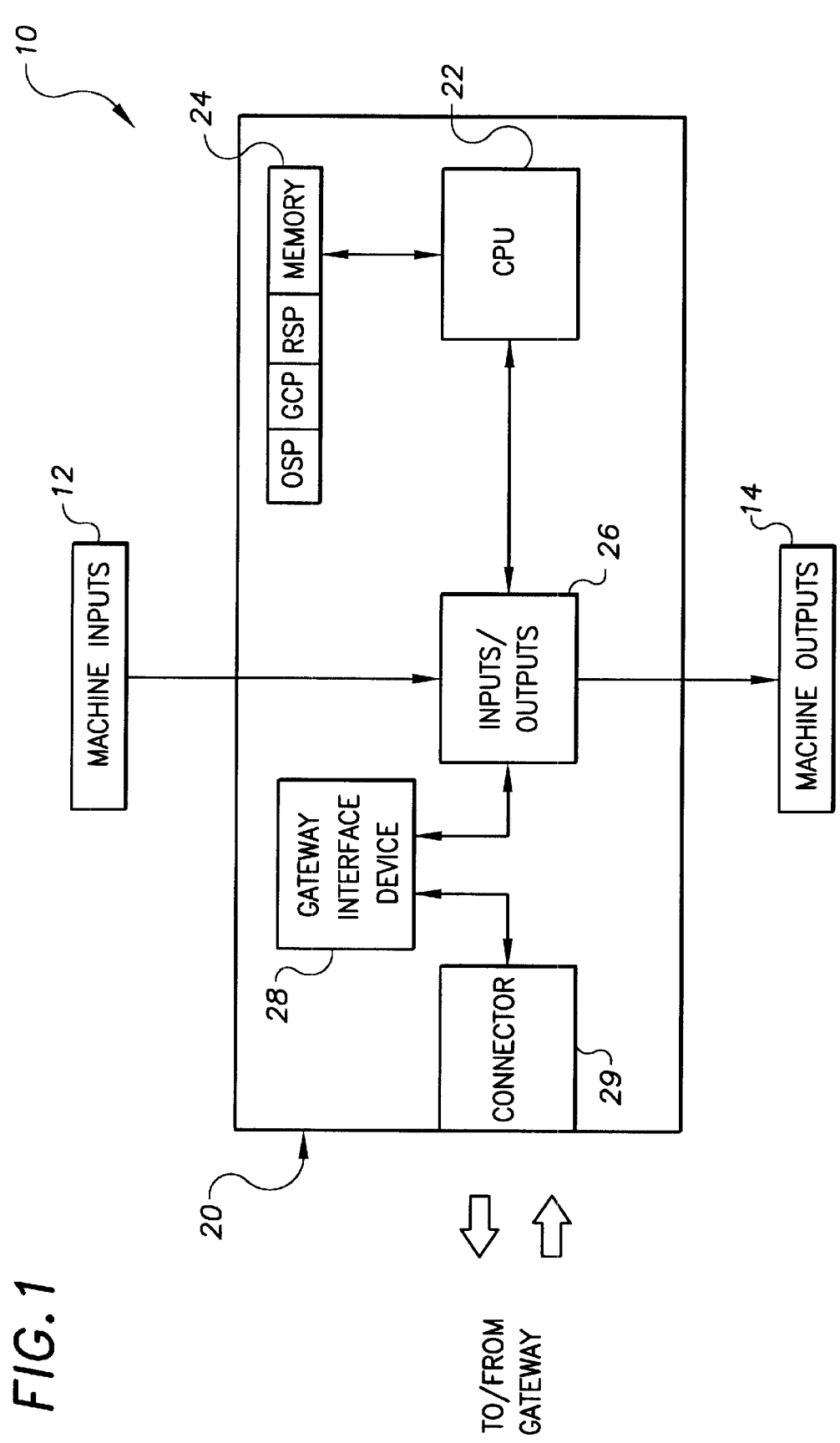
FIG. 1 is a welding machine with a processor based embedded controller according to an exemplary embodiment of the invention.

FIG. 1 illustrates an exemplary welding machine 10 comprising a processor based embedded controller 20 having a microprocessor (CPU) 22, also referred to herein as a processor, and memory 24 associated therewith, for controlling the operation of the machine.

The memory of the exemplary embodiment is a schematic representation of various forms of memory typical of processor based embedded controllers, including for example ROM, RAM and EPROMS, among others, as is known to those having ordinary skill in the art.

Processors having limited processing capacity, for example, 4, 8 and 16 bit processors are generally suitable for use in most embodiments of the present invention, and are particularly desirable for their low cost. In other embodiments, however, other higher capacity processors may be used, for example 32 bit devices, and thus the invention is not limited to embedded controllers having low processing capacity processors.

The welding machine 10 also comprises machine input devices 12 coupled to an input of the embedded controller, and processor controlled machine output devices 14 coupled to an output thereof. The machine inputs and outputs are generally coupled to the processor 22 by one or more input/output interface devices, illustrated schematically at 26, which may provide buffering and/or multiplexing of signals communicated to and from the processor.

The input devices 12 in the exemplary welding machine correspond generally to welding machine inputs and controls, some of which may be controllable by a user from a control panel of the machine, whereas others are derived from controls sensors on the machine.

Exemplary welding machine inputs include, for example, ON/OFF controls, system configuration settings, current and voltage settings and values, wave-form signatures settings, wire feed, and gas mixture and flow settings, among many others, depending on the particular welding machine, as is known generally by those having ordinary skill in the art.

The welding machine and particularly the embedded controller thereof also comprises a welding machine operating software program segment (OSP) stored in the memory 24 for execution by the processor. The OSP controls operation of the welding machine generally, for example by controlling the machine outputs 14 based on signals at the machine inputs 12 in accordance with pre-programmed instructions of the OSP.

In one embodiment of the invention, the welding machine comprises a network gateway interface device 28 coupled to the embedded controller, and particularly to the processor 22 thereof, either directly or via the input/output interface device 26, depending on the configuration of the embedded controller. The gateway interface device 28 generally permits communication between the embedded controller and a network gateway, as discussed more fully below.

In the exemplary embodiment, the gateway interface device 28 is a universal a synchronous receiver transmitter (UART) coupled to an RS232 configured cable connector 29 for a hard-wire communication link between the welding machine and the network gateway.

In other embodiments, however, the interface device 28 and connector 29 may be configured for other hard-wire protocols, which are well known to those having ordinary skill in the art.

The gateway interface device 28 and connector 29 are illustrated as discrete components, but in some other embodiments they may be integrated on or as a single device. Alternatively, the interface device 28 may be a wireless communication device, for example an RF or IR transmitter/receiver, thus obviating the requirement for a cable connector.

The machine also comprises a gateway communication program segment (GCP) stored at least partially in the memory 24 of the embedded controller for execution by the processor 22. The gateway communication program segment enables communication between the embedded controller and the network gateway, via the gateway interface device.

The gateway communication program segment includes a gateway communication protocol, preferably a lightweight network protocol that does not require substantial memory resources and processing capacity.

In one embodiment, the gateway communication program segment is emNET, which is part of the EMIT Device Internetworking Software, by emWARE, Salt Lake City, Utah. In other embodiments, other protocols may be used, including for example CAN, Device Net, Ethernet, RS-232, RS-485 and WAP, among others.

In some embodiments, for example in welding machines having relatively low processing capacity and/or limited memory resources, the embedded controller comprises a resource sharing program segment (RSP) stored in the memory thereof. The resource sharing program segment allocates processing time between the gateway communication program segment (GCP) and the machine operating program segment (OSP), as illustrated in FIG. 3, for example by round-robin scheduling or some other resource management routine.

In one embodiment, the resource sharing program segment (RSP) is emMICRO, which is part of the EMIT Device Internetworking Software, by emWARE, Salt Lake City, Utah, although other equivalent programs may be used alternatively.

The resource sharing program segment (RSP) enables welding machines having relatively limited processing capacity and/or limited memory resources to more effectively operate both the welding machine operating program segment (OSP) and the network gateway communication segment (GCP).

The resource sharing program segment (RSP) may be required in some embodiments, depend on the processing capacity and memory resources of the embedded controller. In some embodiments, for example where the processor has substantial processing capacity and memory resources, the resource sharing program segment (RSP) may not be required, but may still be used.

The resource sharing program segment (RSP) is particularly desirable in applications where the embedded controller has limited memory and the processor has limited processing capacity, for example in applications having 4 and 8 bit processors and in some applications having 16 bit processors.

In FIG. 2, the embedded controller is coupled to a network gateway 30 by a gateway communications link controlled by the gateway communication program, a portion of which may be stored on the network gateway, as discussed above. In the exemplary embodiment, the network gateway is an Internet service provider (ISP) coupled to the welding machine, and particularly to the interface device of the embedded controller thereof. In other embodiments, the network gateway may be a server/PC.

The network gateway 30 is coupled to a communication network 50 having a network communication protocol, for example an open network protocol like the Internet protocol, TCP/IP. In other embodiments, however, the welding machine is coupled to a closed network, for example a wide area network (WAN), having some other commercially available or proprietary communication protocol.

The gateway communication protocol is generally different from, and in embodiments where the welding machine has limited processing capacity preferably less complex than, the network communication protocol, which may be incapable of efficient execution by processors having limited processing capacity and memory.

In embodiments where the gateway communication protocol is different from and the network communication protocol, the network gateway 30 includes a gateway bridge program segment that bridges communication between the network and the gateway communications link.

In one embodiment, the gateway bridge program segment is emGATEWAY, which is part of the EMIT Device Internetworking Software, by emWARE, Salt Lake City, Utah, although other equivalent programs may be used alternatively.

In other embodiments, the gateway communication protocol is the same as the network communication protocol, for example the processor may be capable of processing more complex communication protocols, like TCP/IP or others. The resource sharing program segment (RSP) may also be used in these embodiments to allocate processing time of the processor, but may not be required.

In FIG. 2, the welding machine 10 is coupled to the ISP by a router 40. Generally, a plurality of welding machines may be coupled to the network gateway 50, or Internet service provider, with or without the router 40, as illustrated schematically. The router operates as a polling device in embodiments where a plurality of machines are coupled thereto.

FIG. 2 illustrates another welding machine 11 having an embedded controller, which is configured generally the same as the embedded controller 20 of FIG. 1, with an operating program segment (OSP), a gateway communication program segment (GCP), and a resource sharing program segment (RSP) coupled directly to the network gateway. More generally, a plurality of machines may be coupled to the ISP or directly to the gateway 30, as illustrated schematically.

The one or more welding machines coupled to the network gateway generally have a unique network address assigned thereto for communications to and from the network 50 via the network gateway 30. In embodiments where the network is the Internet, the plurality of welding machines may each have a unique Internet addresses.

The network gateway directs communications received over the network 50 to the appropriate welding machine coupled thereto via the gateway communications link. And in embodiments where the network and gateway communication protocols are different, the gateway bridge program segment bridges communications between the network communication protocol and the gateway communication protocol.

FIG. 2 illustrates a remote user interface device 60 coupled to the network gateway 30 by the network 50 for remotely communicating with the one or more welding machines coupled to the network gateway. The device 60 may be a personal computer (PC) connected to the network 50 or a personal digital assistant (PDA) or some other network enabled communication device.

Welding machines coupled to the network, as illustrated in the exemplary schematic of FIG. 2, may be operated and/or controlled and/or monitored and/or accessed and/or updated or reconfigured with software via the network from the remote user interface.

The remote user interface device is preferably a virtual software panel, for example one embodied on an Internet browser operating an object oriented programming language such as JAVA or PERL, but in alternative embodiments may take other forms.

In some applications, the remote user interface is configured for remote operation of the machine. For this purpose, the remote user interface may duplicate in whole or in part, for example in virtual form, controls on the control panel of the actual welding machine, as well as other controls not accessible to the end user, thus permitting real time control or operation thereof via the network.

In other applications, the welding machine may be interrogated from the remote user interface. In some applications, for example, it is desirable to monitor various operational parameters of the welding machine, e.g. voltage and current settings, gas mixtures and flow rates, wire feed rates, etc., in real time and/or to download historical operational data previously sampled and stored in a portion of memory on the embedded controller. These and other remote welding machine monitoring and interrogation schemes may be implemented, for example, to ensure proper welding machine operation and weld quality, or for other supervisory purposes.

Another exemplary application is the monitoring of welding machine operation and interrogation of data stored thereon from the remote user interface for service and problem solving purposes, thereby eliminating the need, at least initially, for on-site service calls.

Besides remotely monitoring welding machine operation and accessing data stored thereon, the machine may also be subject to a remotely administered operational test, for example by cycling the machine through various modes of operation to identify problems. These and other remotely administered schemes may be implemented by manufacturers as part of a product warranty and/or service program.

In other applications, supplemental or updated firmware or software may be transferred onto the welding machine, and particularly into the memory of the embedded controller, from the remote user interface via the network. The software update or reconfiguration may be performed for example, as an upload by the manufacturer or some other party from an off-site location, thereby eliminating the requirement for manually installing software distributed on hard-copy formats like floppy diskettes or CD-rom diskettes and/or updating hardware components, for example circuit boards or board level memory devices having the new firmware.

In some welding machines, software having new or updated wave-form signatures may be transferred onto the welding machine from the remote user interface, rather than manually installing the software using prior art data cards. Other welding machines may require a particular software configuration depending, for example, on the particular type of welding to be performed. This software may be updated or transferred onto the machine from a remote user interface provided by the manufacturer, thereby reducing the amount of software that must be installed initially onto the machine by the manufacturer.

While the foregoing written description of the invention enables one of ordinary skill to make and use what is considered presently to be the best mode thereof, those of ordinary skill will understand and appreciate the existence of variations, combinations, and equivalents of the specific exemplary embodiments herein. The invention is therefore to be limited not by the exemplary embodiments herein, but by all embodiments within the scope and spirit of the appended claims.

What is claimed is:

1. A welding machine, comprising:
    an embedded controller having a processor and memory;
    a network gateway interface device coupled to the embedded controller;
    a machine operating program segment stored in a memory portion of the embedded controller;
    a gateway communication program segment stored at least partially in a memory portion of the embedded controller; and
    a resource sharing program segment stored in a memory portion of the embedded controller,
    whereby the resource sharing program segment allocates processing time of the processor between the gateway communication program segment and the machine operating program segment.

2. The welding machine of claim 1, the gateway communication program segment includes a gateway communication protocol.

3. The welding machine of claim 1, user controlled machine input devices coupled to an input of the embedded controller, processor controlled machine output devices coupled to an output of the embedded controller.

4. The welding machine of claim 1, a unique network address associated with the welding machine.

5. A welding system comprising:
    a welding machine having a processor based embedded controller with memory, user controlled input devices coupled to the embedded controller, processor controlled output devices coupled to the embedded controller, and a gateway interface device coupled to the embedded controller;
    a machine operating program segment stored in a memory portion of the embedded controller;
    a gateway communication program segment stored at least partially in a memory portion of the embedded controller;
    a resource sharing program segment stored in a memory portion of the embedded controller,
    the resource sharing program segment allocating processing time of the processor between the gateway communication program segment and the machine operating program segment;
    a network gateway coupled to the gateway interface device of the embedded controller by a gateway communications link.

6. The welding system of claim 5, the network gateway coupled to a network having a network communication protocol, the gateway communication program segment includes a gateway communication protocol different than the network communication protocol, a gateway bridge program segment stored on the network gateway.

7. The welding system of claim 6, the processor has limited processing capacity.

8. The welding system of claim 6, a unique network address assigned to the welding machine.

9. The welding system of claim 8, a remote welding machine user interface device coupled to the network gateway by the network.

10. The welding system of claim 9, the remote user interface device is a virtual software control panel.

11. The welding system of claim 9, the network protocol is TCP/IP, the remote welding machine user interface device is a virtual software control panel embodied in an Internet browser.

12. The welding system of claim 6, the network communication protocol is TCP/IP.

13. The welding system of claim 12, the processor is not more than a 16 bit device.

14. The welding system of claim 12, the network gateway is an Internet service provider.

15. The welding system of claim 14, a routing device interconnecting the gateway interface device of the welding machine to the Internet service provider.

16. A method for a welding machine having a processor based embedded controller remotely accessible over a network, comprising:
    communicating between a remote user interface and a network gateway over the network using a network communication protocol;
    communicating between the network gateway and the welding machine over a gateway communications link using a gateway communication program protocol different from the network communication protocol;
    bridging communications between the network and the gateway communication link with a gateway bridge program.

17. The method of claim 16, operating the welding machine with a machine operating program segment stored in a memory portion of the embedded controller, implementing the gateway communication protocol with a gateway communication program segment stored in a memory portion of the embedded controller, allocating processing time of the processor on the embedded controller between execution of the machine operating program segment and the gateway communication program segment and with a resource sharing program segment stored in a memory portion of the embedded controller.

18. The method of claim 17, storing welding machine operational data in a memory portion of the embedded controller, remotely accessing the stored welding machine operational data from the remote user interface.

19. The method of claim 17, monitoring welding machine operation in real time from the remote user interface.

20. The method of claim 17, transferring software from the remote user interface onto the welding machine.

21. The method of claim 17, operating the welding machine from the remote user interface.

22. A method for a welding machine monitoring system, the machine having a processor based embedded controller with memory, the method comprising;
    enabling the machine to communicate over a network by establishing a network communication link between the welding machine and the network;
    conmunicating with the welding machine from a remote user interface embodied as a virtual control panel on an Internet browser over the network;
    monitoring operational parameters of the machine from the remote user interface;
    communicating between the remote user interface and a network gateway over the network using a TCP/IP network communication protocol;

communicating between the network gateway and the machine over a gateway communications link using a gateway communication protocol different from the TCP/IP network communication protocol;

bridging communications between the network and the gateway communications link with a gateway bridge program.

23. The method of claim 22, sampling and storing operational data of the machine in a memory portion of the embedded controller, accessing the operational data stored in the memory portion of the embedded controller from the remote user interface.

24. The method of claim 22, monitoring operational parameters of the machine in real time from the remote user interface.

25. The method of claim 22, operating the machine with a machine operating program segment stored in a memory portion of the embedded controller, implementing the gateway communication protocol with a gateway communication segment stored in a memory portion of the embedded controller, allocating processing time of the processor on the embedded controller between execution of the machine operating program segment and the gateway communication program segment and with a resource sharing program segment stored in a memory portion of the embedded controller.

26. A method for welding machine software reconfiguration, the machine having a processor based embedded controller with memory and a machine operating program segment stored therein, the method comprising:

enabling the machine to communicate over a network by establishing a network communication link between the machine and the network;

communicating with the machine over the network from a remote user interface embodied as a virtual control panel on an Internet browser;

transferring software over the network from the remote user interface to a memory portion of the embedded controller;

communicating between the remote user interface and a network gateway over the network using a network communication protocol, communicating between the network gateway and the machine over a gateway communications link using a gateway communication protocol different from the network communication protocol, bridging communications between the network and the gateway communication link with a gateway bridge program;

implementing the gateway communication protocol with a gateway communication segment stored in a memory portion of the embedded controller, allocating processing time of the processor on the embedded controller between execution of the welding machine operating program segment and the gateway communication program segment and with a resource sharing program segment stored in a memory portion of the embedded controller.

\* \* \* \* \*